(12) United States Patent
Divan et al.

(10) Patent No.: US 9,590,421 B2
(45) Date of Patent: Mar. 7, 2017

(54) DYNAMIC POWER FLOW CONTROLLERS

(71) Applicant: VARENTEC, INC., San Jose, CA (US)

(72) Inventors: Deepakraj M. Divan, San Jose, CA (US); Anish Prasai, San Jose, CA (US)

(73) Assignee: VARENTEC, INC., Santa Clara, CA (US)

( * ) Notice: Subject to any disclaimer, the term of this patent is extended or adjusted under 35 U.S.C. 154(b) by 314 days.

(21) Appl. No.: 14/260,253

(22) Filed: Apr. 23, 2014

(65) Prior Publication Data
US 2014/0319910 A1   Oct. 30, 2014

Related U.S. Application Data

(60) Provisional application No. 61/815,241, filed on Apr. 23, 2013.

(51) Int. Cl.
| | |
|---|---|
| *H02J 3/06* | (2006.01) |
| *G05F 1/70* | (2006.01) |
| *H02J 3/18* | (2006.01) |
| *H02P 13/06* | (2006.01) |
| *H02M 5/10* | (2006.01) |
| *H02M 1/00* | (2006.01) |

(52) U.S. Cl.
CPC .............. *H02J 3/06* (2013.01); *G05F 1/70* (2013.01); *H02J 3/1878* (2013.01); *H02P 13/06* (2013.01); *H02M 5/10* (2013.01); *H02M 2001/0077* (2013.01); *Y10T 307/32* (2015.04)

(58) Field of Classification Search
CPC ................... H02J 3/06; H02J 1/10; H02J 3/14
USPC ......................................................... 307/20
See application file for complete search history.

(56) References Cited

U.S. PATENT DOCUMENTS

| | | | | |
|---|---|---|---|---|
| 4,135,101 | A  * | 1/1979 | Young ....................... | H02J 3/14 307/3 |
| 5,909,367 | A | 6/1999 | Change | |
| 6,259,610 | B1 * | 7/2001 | Karl ...................... | H03K 17/725 363/21.07 |
| 6,969,927 | B1 * | 11/2005 | Lee ........................... | H02J 3/14 307/17 |
| 7,091,703 | B2 | 8/2006 | Folts et al. | |

(Continued)

OTHER PUBLICATIONS

Das, Debrup, Dynamic Control of Grid Power Flow Using Controllable Network Transformers, , Doctoral Thesis, Georgia Institute of Technology, May 2012, pp. 1-250.

(Continued)

*Primary Examiner* — Jared Fureman
*Assistant Examiner* — Alfonso Perez Borroto
(74) *Attorney, Agent, or Firm* — Sheppard Mullin Richter & Hampton LLP

(57) ABSTRACT

Dynamic power flow controllers are provided. A dynamic power flow controller may comprise a transformer and a power converter. The power converter is subject to low voltage stresses and not floated at line voltage. In addition, the power converter is rated at a fraction of the total power controlled. A dynamic power flow controller controls both the real and the reactive power flow between two AC sources having the same frequency. A dynamic power flow controller inserts a voltage with controllable magnitude and phase between two AC sources; thereby effecting control of active and reactive power flows between two AC sources.

13 Claims, 14 Drawing Sheets

(56) References Cited

U.S. PATENT DOCUMENTS 8,097,973 B2 * 1/2012 Yu ........................... H04B 3/56
307/3
8,729,844 B2 * 5/2014 Feng ....................... H02P 27/06
318/105

OTHER PUBLICATIONS

Patent Cooperation Treaty, International Search Report for PCT/US2014/035210, Sep. 3, 2014, pp. 1-2.

* cited by examiner

DYNAMIC POWER FLOW CONTROLLERS

CROSS-REFERENCE TO RELATED APPLICATIONS

This application claims benefit of U.S. Provisional Patent Application No. 61/815,241, filed on Apr. 23, 2013, entitled "Transformers with Dynamic Control of Phase Angle and Voltage," which is hereby incorporated herein by reference in its entirety.

STATEMENT OF RIGHTS TO INVENTIONS MADE UNDER FEDERALLY SPONSORED RESEARCH

This invention was made with Government support under DE-AR0000229 awarded by the United States Department of Energy. The Government has certain rights in the invention.

TECHNICAL FIELD

The present invention(s) relate generally to controlling power flow in an electric power system. More particularly, the invention(s) relate to dynamic power flow controllers in an electric power system.

DESCRIPTION OF THE RELATED ART

An electric power system is a network of interconnected electrical equipments that generate, transmit, and consume electric power. Electric power is delivered to consumers through a transmission network and a distribution network from generators to consumers. The transmission network and the distribution network are often known as the transmission grid and the distribution grid, respectively. Operation of the transmission grid and the distribution grid was once straightforward before the deregulation of the electric power market, but became extremely complex as a result of the competition among various utility companies. Increased amount of electric power is flowing in the electric power system and causing congestion and overflow in certain parts of the electric power system, which may limit the capacity of the electric power system and also impact the reliability of the electric power system. As the electric power system is highly dynamic, real-time power flow control ensures the electric power system's reliability and increases its capacity and efficiency.

Various devices can be installed on the electric power system to perform electric power flow controls such as a Phase Angle Regulator (PAR), also known as a Phase Shifting Transformer (PST), and a Unified Power Flow Controller (UPFC). PARs or PSTs correct the phase angle difference between two parallel connected electrical transmission systems and thereby control the power flow between the two systems so that each can be loaded to its maximum capacity. Conventional PARs and PSTs insert a series voltage to a phase that is in quadrature with the line-to-neutral voltage. However, conventional PARs or PSTs cannot control the reactive power flow independently from the active power flow. Their dynamic capabilities, if they exist, are also very limited.

UPFCs comprise two inverters where the active power can freely flow in either direction between the two inverters and each inverter can independently generate or absorb reactive power. UPFCs typically can insert a desired series voltage, balancing average power flow using the shunt inverter. However, UPFCs are typically used at very high power and voltage levels (100 MW @ 345 KV). The need for the UPFC to survive faults and abnormal events on the grid makes their design complex and expensive. As a result, although UPFC's have been commercially available for decades, few have been deployed.

BRIEF SUMMARY OF EMBODIMENTS OF THE INVENTION

Methods and systems of dynamic power flow controllers are provided. Various embodiments may comprise a transformer and a power converter. The power converter is subject to low voltage stresses and not floated at line voltage. In addition, the power converter is rated at a fraction of the total power controlled. The power converter operates at close to neutral and ground potential, which may eliminate a need for complex platforms as well as isolation techniques. As such, the cost and complexity of such implementations may be reduced significantly.

Dynamic power flow controllers may be implemented in a single-phase or in a three-phase configuration, but the operation of a dynamic power flow controller cross-couples all three phases. A dynamic power flow controller may be installed around a sectionalizer device at a T-junction such that dynamic power flow controllers may be deployed into a meshed grid. Further, various embodiments may act autonomously but in a coordinated manner when deployed to a grid. Various embodiments enable power routing along a specific path to the target, which in turn make it feasible to open up new and competitive energy markets.

A dynamic power flow controller controls both the real and the reactive power flow between two AC sources having the same frequency. Various embodiments insert a voltage with controllable magnitude and phase between two AC sources; thereby effecting control of active and reactive power flows between two AC sources. In some embodiments, by controlling the average duty cycle of a power converter, the effective phase angle between two voltages may be regulated. In further embodiments, by modulating the duty cycle of the voltage converters with an even harmonic, the amplitude of the inserted voltage may be adjusted with respect to the AC source voltages.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Before describing the invention in detail, it is useful to describe a few example environments with which the invention can be implemented. One such example is that of illustrated in FIG. 1.

Figure 1:
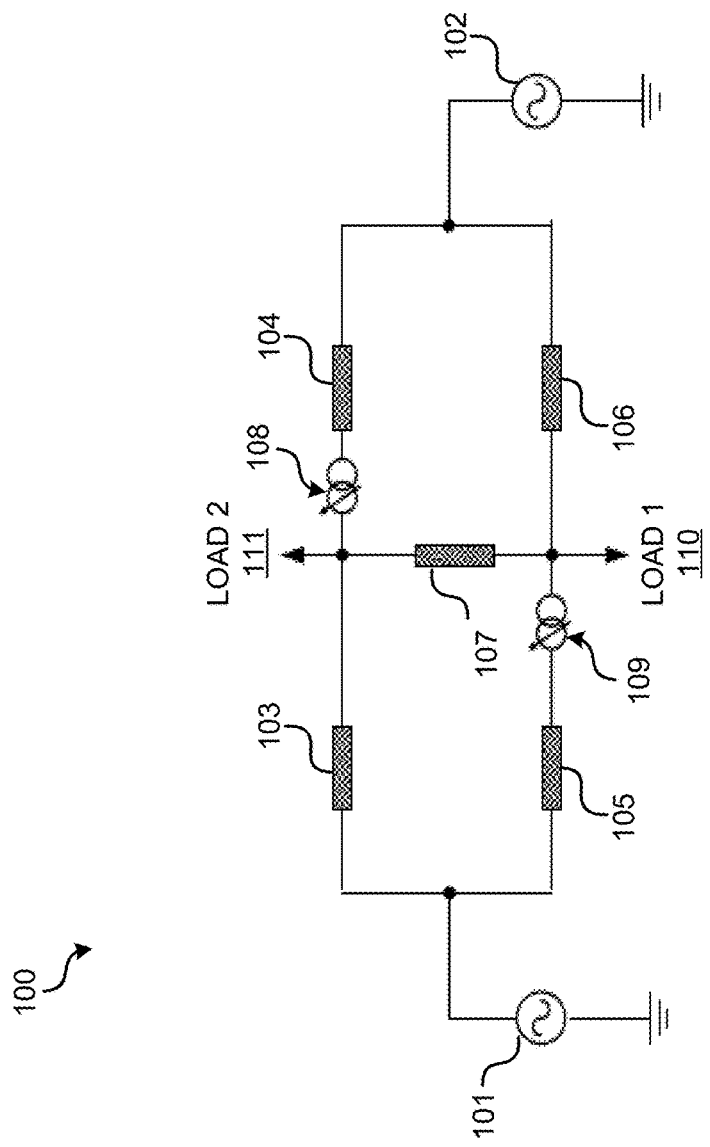
FIG. 1 illustrates an exemplary system diagram of an electric power system where various embodiments of the invention can be implemented.

FIG. 1 illustrates an exemplary system diagram of an electric power system 100 where various embodiments of the invention can be implemented. The electric power system 100 comprises generators 101 and 102; loads 110 and 111; and transmission lines 103-107, which may have different ratings and are loaded differently. One or more dynamic power flow controllers described herein may be deployed to the power system 100, especially around existing sectionalizers, reclosers or breaker devices in any transmission line where a T-junction is located. In the illustrated example, two dynamic power flow controllers 108 and 109 are installed. As a result of this installation, power flows of the power system 100 may be controlled. That is, both the active and reactive power along each transmission line of the power system 100 may be redirected.

From time-to-time, the present invention is described herein in terms of this example environment. Description in terms of these environments is provided to allow the various features and embodiments of the invention to be portrayed in the context of an exemplary application. After reading this description, it will become apparent to one of ordinary skill in the art how the invention can be implemented in different and alternative environments.

Figure 2A:
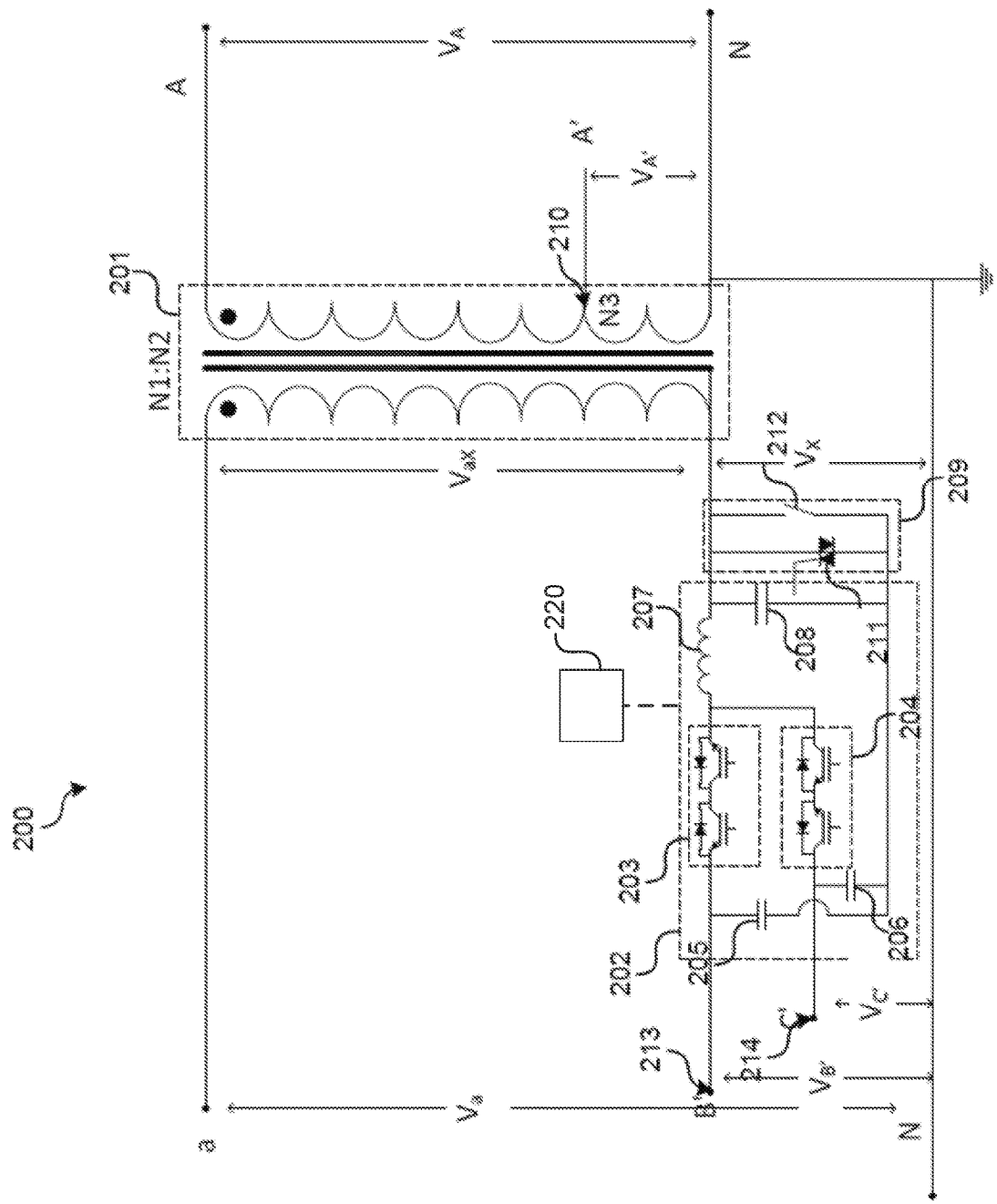
FIG. 2A illustrates a schematic diagram of a single-phase dynamic power flow controller in accordance with an embodiment of the present application.

FIG. 2A illustrates a schematic diagram of a single-phase dynamic power flow controller 200 in accordance with an embodiment of the present application. The dynamic power flow controller 200 comprises a transformer 201 and a power converter 202. As illustrated, the power converter 202 is a direct AC converter comprising switches 203-204, capacitors 205-208, and an inductor 207. The dynamic power flow controller 200 may comprise a fail-normal switch 209. The transformer 201 may be a three-phase transformer or a single-phase transformer. The transformer 201 is fully rated. The power converter 202 is fractionally-rated, compared with the transformer 201, and is referenced to ground. The transformer 201 may be coupled to a line-neutral voltage, $V_A$. In the illustrated example, the $N_2$ windings of the transformer 201 is coupled to the line-neutral voltage $V_A$. The transformer 201 converts the line-neutral voltages $V_A$ to a voltage, $V_{aX}$, that is across the $N_1$ windings of the transformer 201. The voltage $V_{aX}$ equals to $nV_A$, where 'n' is the effective turns ration of the transformer 201 and equals to N1/(N2+N3).

A transformer may be coupled to voltages at different levels. For example, a transformer may be coupled to voltages at a higher level (e.g., 139 kV, 13 kV), and voltages at a lower voltage level (e.g., 39 kV, 13 kV, 480V). The transformer 201 may further provide $V_A'$ using a tapped winding. A tap 210 may be provided on windings (e.g., the $N_2$ windings of the transformer 201) of the transformer thereby providing a voltage point $V_A'$. The tapped winding may be located on windings on different sides of the transformer, and may be selected such that the resulting voltage stress can be handled by available semiconductor devices. When the transformer 201 is a three-phase transformer, the voltages $V_B'$ and $V_C'$ may be obtained from tapped windings of the transformer 201. When the transformer 201 is a single-phase transformer, the voltages $V_B'$ and $V_C'$ may be obtained by using taps of the transformers for phases B and C, respectively. In some embodiments, the voltages $V_A'$, $V_B'$ and $V_C'$ may be obtained by using a separate winding. One of ordinary skill in the art would appreciate that voltages $V_A'$, $V_B'$ and $V_C'$ may be obtained differently.

As illustrated, the switches 203-204 are AC switches. The AC switches 203-204 are configured by using the common-collector or the common-emitter configuration. In some embodiments, the switches 203-204 may be integrated with the transformer 201. The maximum voltage stress that the AC switches 203-204 are subjected to is much lower than the line-neutral voltage $V_a$. For example, for a 39 kV (line-line) voltage level, the maximum voltage stress across the switches may be 2.4 kV. The maximum current stress that the AC switches 203-204 are subjected to equal to the maximum line current $I_a$. As such, the power converter 202 is fractionally-rated compared to the amount of power the dynamic power flow controller 200 may control. For example, with a typical target of 5% control range, a 100 kW converter could control 2 MW of power flow. In addition, the power converter 202 is referenced to the neutral voltage.

The power converter 202 may inject a voltage $V_X$ in series with the voltage across the $N_1$ windings of the transformer 201. The output of the power converter 202 may be coupled to the transformer 201 that is coupled to phase A. The input of the power converter 202 may be coupled to voltages $V_B'$ and $V_C'$ that correspond to the phases B and C, respectively. As illustrated, the input of power converter 202 may be coupled to the tap windings 213 and 214 of the transformer 201 that provide voltages $V_B'$ and $V_C'$, respectively, and the output of the power converter 202 may be coupled to the $N_1$ winding of the transformer 201. In various embodiments, the power flow controller 200 may comprise a control module 220. For example, controller module 220 may include a computing module 800, as described herein in reference to FIG. 8. The control module regulates the switches 203-204, in other words, the duty cycle D of the AC converter 202. When the switch 203 is on, the secondary winding of the transformer 201 is coupled to the voltage $V_B'$. When the switch 204 is on, the secondary winding of the transformer 201 is coupled to the voltage $V_C'$. By controlling the duty cycle, D, the voltage $V_X=V_B'D+V_C'(1-D)$ may be regulated to be linearly varied between $V_B'$ and $V_C'$. The voltage $V_X$ may be inserted in series with the voltage across the $N_1$ windings of the transformer 201. As such, the line-neutral voltage $V_a$ may be represented as: $V_a=V_{aX}+V_X$.

The line-neutral voltage (e.g., for phase A) $V_a$, may be regulated by the dynamic power flow controller 200 with reference to the line-neutral voltage $V_A$, according to Equation (1):

$$V_a = nV_A + V_X = \qquad (1)$$
$$nV_A + V_B'D + V_C'(1-D) = nV_A + \alpha V_B D + \alpha V_C (1-D),$$

where $V_B' = \alpha V_B,$ $V_C' = \alpha V_C,$ $n = \dfrac{N_1}{N_2 + N_3},$ $\alpha = \dfrac{N_3}{N_2 + N_3}.$ The inserted voltage $V_X$ may be in quadrature with respect to a line-to-neutral voltage (e.g., $V_A$). The phase-shift angle δ between voltages (e.g., $V_A$ and $V_a$) may be regulated through changing the amplitude of the inserted voltage (e.g., $V_X$). By controlling the duty cycle D of the power converter 202 to a constant that is in a range of [0, 1], the dynamic power flow controller may regulate the line-neutral voltage (e.g., $V_a$) such that it is phase shifted with respect to the line-to-neutral voltage (e.g., $V_A$). The phase-shift angle δ may be between $[\delta_{max}, \delta_{max}]$, where a negative phase-shift angle δ denotes that the line-neutral voltage $V_a$ lags the line-neutral voltage $V_A$ and a positive phase-shift angle δ denotes that the line-neutral voltage $V_a$ leads the line-neutral voltage $V_A$. As such, control of active power is achieved as the active power transferred over a transmission line ( $$P = \dfrac{V_A V_a}{X} \operatorname{Sin}\delta,$$

where X is the line impedance) is a function of δ.

Figure 8:
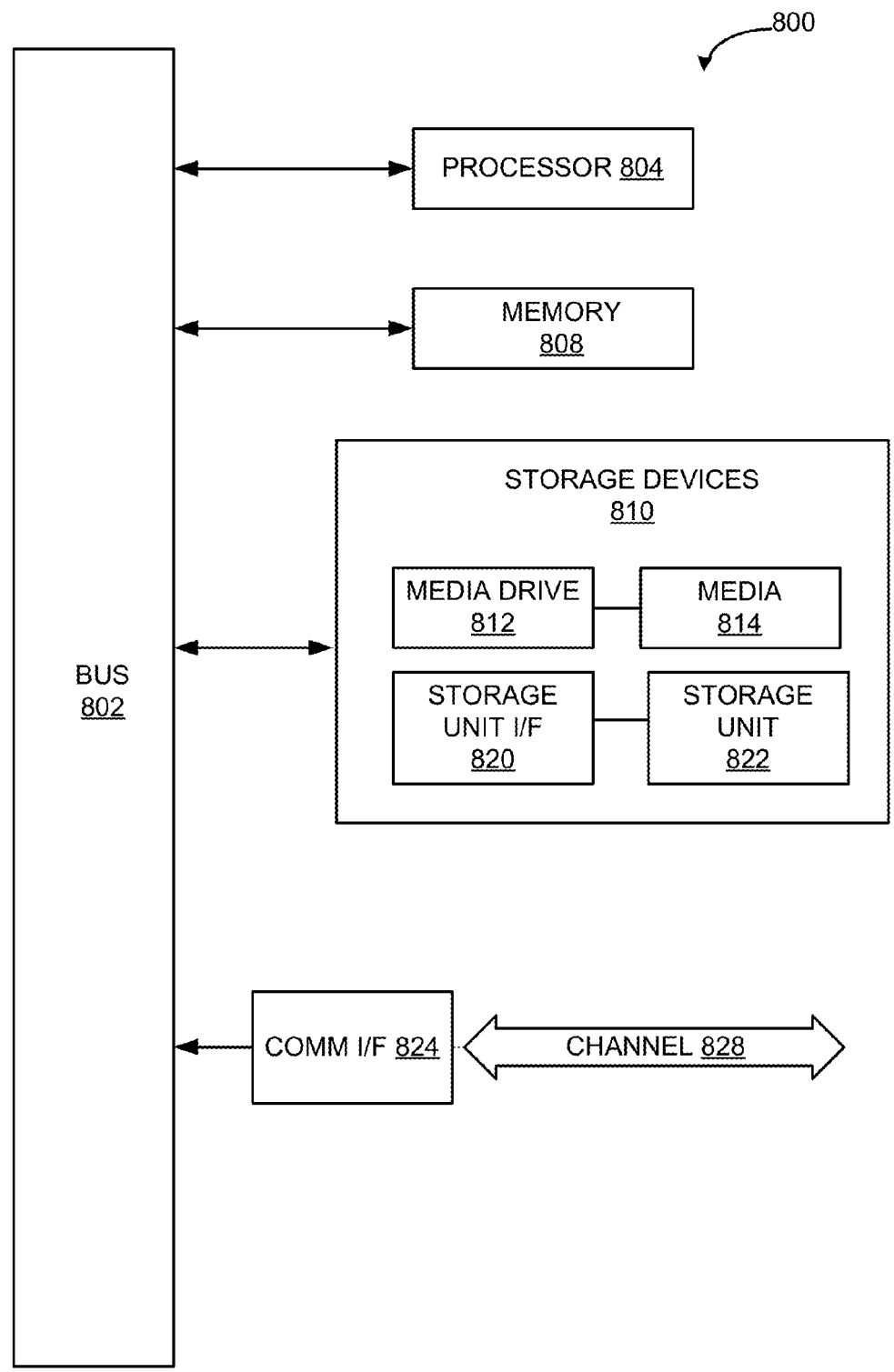
FIG. 8 illustrates an example computing module that may be used in implementing various features of embodiments of the invention.

In some embodiments, the control module may implement the Virtual Quadrature Sources ("VQS") (described in the U.S. Pat. No. 8,179,702, entitled "Voltage Synthesis Using Virtual Quadrature Sources") as the modulation strategy. In one embodiment, the switch duty cycle D is modulated with a constant plus a second harmonic. The control module 209 may be implemented by an example computing module as illustrated in FIG. 8. The control module may be configured to communicate with a grid control center.

The control module may modulate the AC switches (e.g., switches 203-204) of a dynamic power flow controller with an even harmonic such that a direct voltage that is in phase with the line-to-neutral voltage (e.g., $V_A$), may be added to or subtracted from the line-to-neutral voltage (e.g., $V_A$). As such, the dynamic power flow controller may regulate the amplitude of the line-neutral voltage $V_a$ with respect to the line-to-neutral voltage $V_A$. In turn, control of reactive power flow is also achieved as a function of the voltage amplitude $V_A$ and $V_a$. The reactive power flow between two buses is $$Q = \dfrac{V_A V_a}{X}\left(\operatorname{Cos}\delta - \dfrac{V_a}{V_A}\right),$$

where X is the line impedance. The output voltage may be expressed as in Equation (2):

$$V_a = nV_m \sin(\omega t) + \sqrt{3}\alpha K_0 V_m \sin(\omega t - 90°) -$$
$$\sqrt{3}\alpha K_2/2 V_m(\sin(\omega t+\phi_2)+\sin(3\omega t+\phi_2))+\alpha V_m \sin$$
$$(\omega t+120°) \qquad (2),$$

where the duty cycle $D=K_0+K_2 \sin(2\omega t+\phi_2)$, and the input line-neutral-voltages are $V_A=V_m \sin(\omega t)$, $V_B=V_m \sin(\omega t-120°)$, $V_C=V_m \sin(\omega t+120°)$. Eliminating the third harmonic term, as it plays no role in real and reactive power flow at the fundamental frequency, and using phasor arithmetic, the output voltage may be expressed in Equation (3) as a function of input voltage, transformer turn parameters, and coefficients of the duty function:

$$V_a = \qquad (3)$$
$$\left(n - \dfrac{\sqrt{3}}{2}\alpha K_2 \cos(\phi_2) - \dfrac{1}{2}\alpha\right)V_m - j\dfrac{\sqrt{3}}{2}\alpha(2K_0 + K_2 \sin(\phi_2) - 1)V_m.$$

The term $K_0$ may have the greatest impact upon real power flow control because $K_0$ affects the component of the injected voltage, that is orthogonal to the line-neutral voltage. The $K_2$ has the greatest impact upon reactive power flow control because $K_2$ affects the component of the injected voltage, that is in-phase with the line-neutral voltage.

The fail-normal switch 209 may ensure safe operation of the dynamic power flow controller 200 under all conditions. In particular, the fail-normal switch 209 may ensure safe operation of the power converter 202 during start-up, shutdown and typical fault conditions. In the illustrated example, the fail-normal switch 209 comprises a thyristor pair 211 and a normally-on relay 212. The fail-normal switch 209 bypasses the power converter 202. The power converter 202 may be automatically bypassed when the relay 212 is closed, for example, when the dynamic power flow controller 200 is at power-up or loss of control power. The thyristor pair 211 allows faster turn-on and ensures free of the time delays inherent in the operation, while the relay 212 safeguards zero losses in the bypass mode. The thyristor pair 211 and the relay 212 may be coordinated to allow fast turn-on, zero conduction losses, as well as turn off at zero current through turn-off of the thyristor pair 211. When an overvoltage condition or fault condition is detected for the switch 203 or 204, the thyristor pair 211 may be instantaneously turned on, followed as quickly as possible by closing of relay 212. This allows fault current to flow through the fail-normal switch 209 instead of the switches 203 or 204. When the bypass switch 209 is turned on, the dynamic power flow controller 200 operates similarly to a passive transformer. The thyristor pair 211 and the relay 212 may be rated to handle typical line fault currents.

Figure 2B:
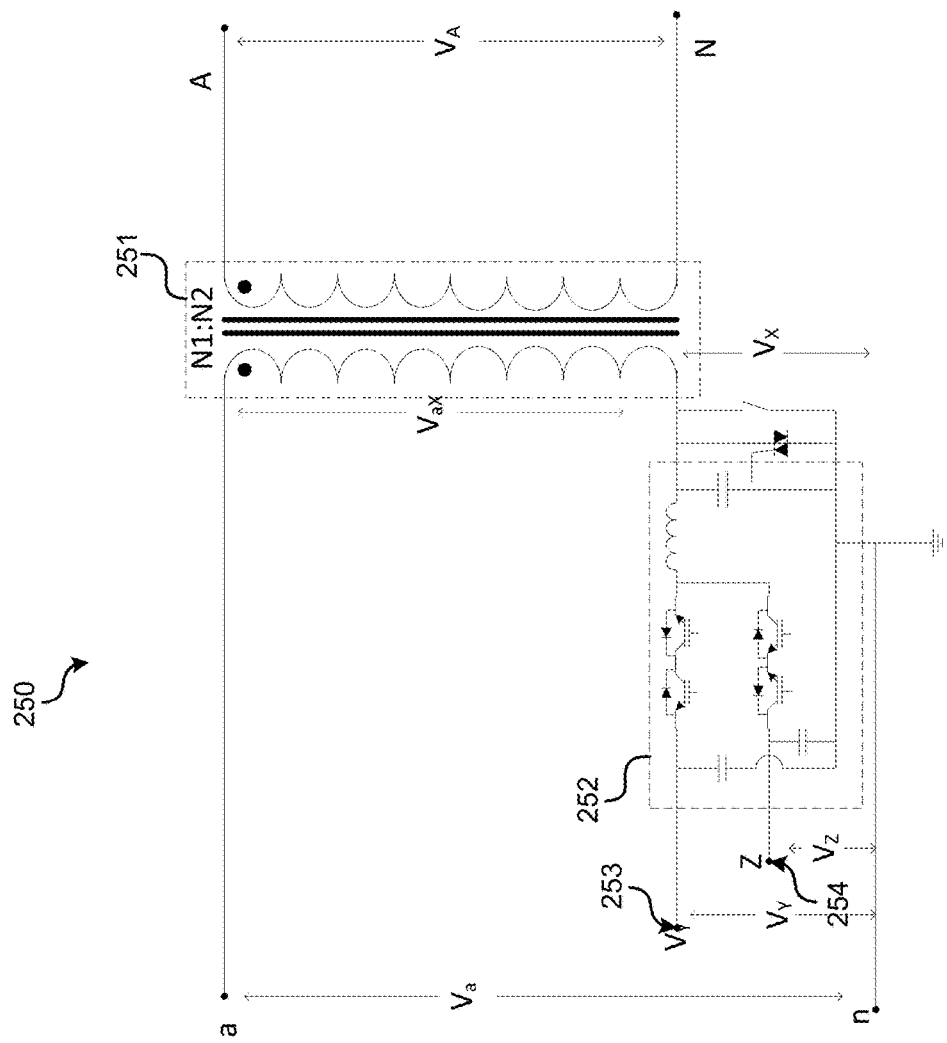
FIG. 2B illustrates a schematic diagram of a single-phase dynamic power flow controller in accordance with an embodiment of the present application.

In some embodiments, the input voltages to the power converter may be provided by a voltage source. FIG. 2B illustrates a schematic diagram of a single-phase dynamic power flow controller 250 in accordance with an embodiment of the present application. The dynamic power flow controller 250 comprises a transformer 251 and a power converter 252. The power converter 252 is coupled to the $N_1$ windings of the transformer 251. The power converter 252 may inject a voltage $V_X$ in series with the voltage across the $N_1$ windings of the transformer 251.

The input of the power converter 252 may be coupled to a set of voltage sources. In the illustrated example, the input of the power converter 252 is coupled to voltage sources 253-254 having voltages $V_Y$ and $V_Z$, respectively. The voltages $V_Y$ and $V_Z$ may be tapped from a voltage source (e.g., a 480 V transmission line, a medium-voltage to 480V transformer, etc.). The power converter 242 operates with a duty cycle, D, between the voltages $V_Y$ and $V_Z$. As such, regulation of the output voltage may be provided on the low-voltage side by using a small rated converter. For instance, with an 8 kV input and 100 kW rating, the output voltage may be changed by 8% using switches (e.g., IGBTs) rated at 1700 V and 25 Amperes. The power converter 252 is small sized and low cost, and may be integrated in the transformer 251. The transformer 251 may be a standard-rated transformer.

Figure 3:
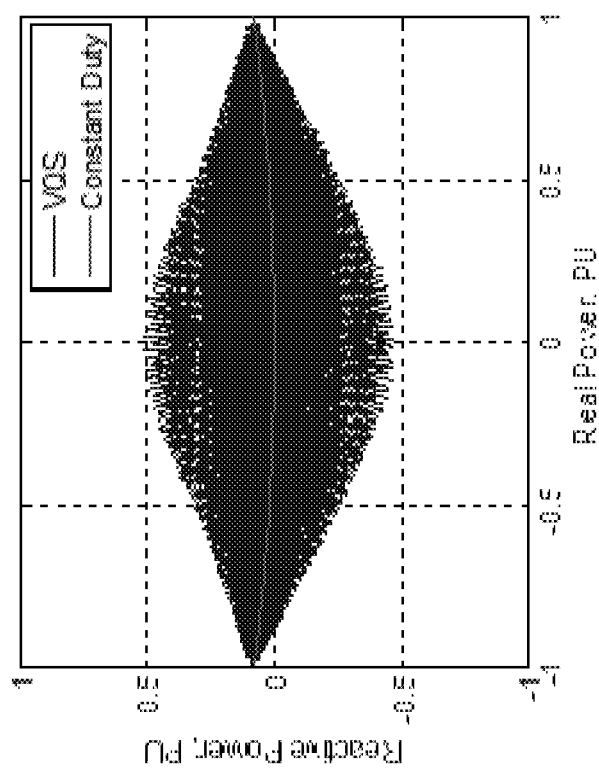
FIG. 3 is a diagram depicting a control range of active power P and reactive power Q of an embodiment described herein.

FIG. 3 is a diagram depicting a control range of active power P and reactive power Q of an embodiment described herein. As illustrated, with a constant duty cycle, control over mostly the active power is achieved. Control over the reactive power is accomplished by regulating the duty cycle according to the VQS technique.

Figure 4A:
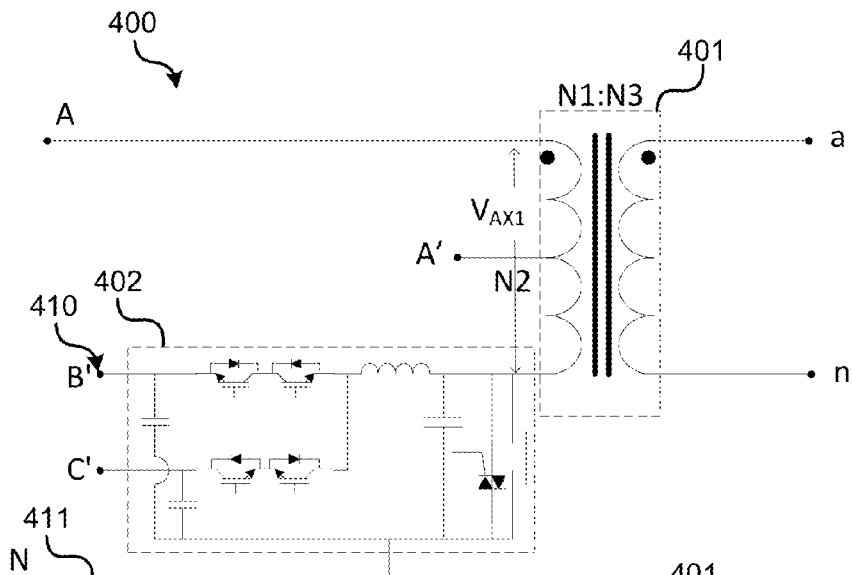
FIGS. 4A-4C illustrate an example schematic diagram of a three-phase dynamic power flow controller in accordance with an embodiment of the present application.
Figure 4B:
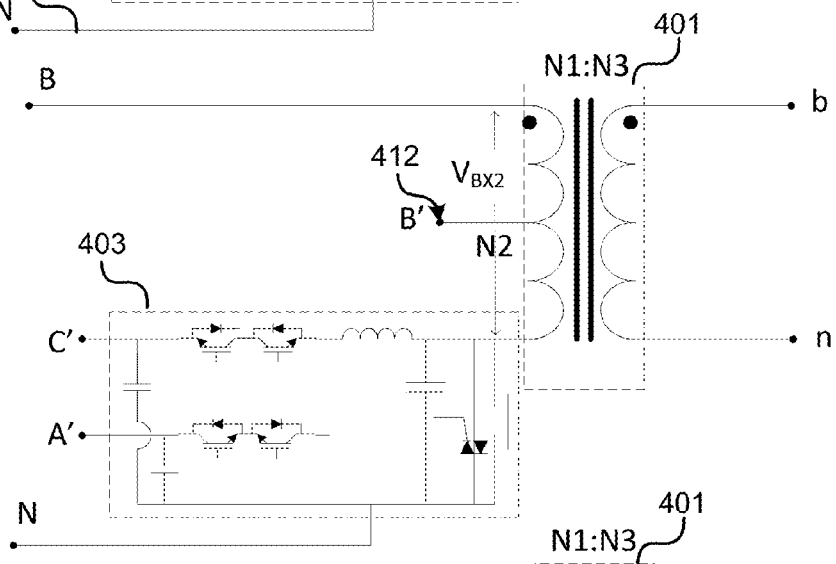
Figure 4C:
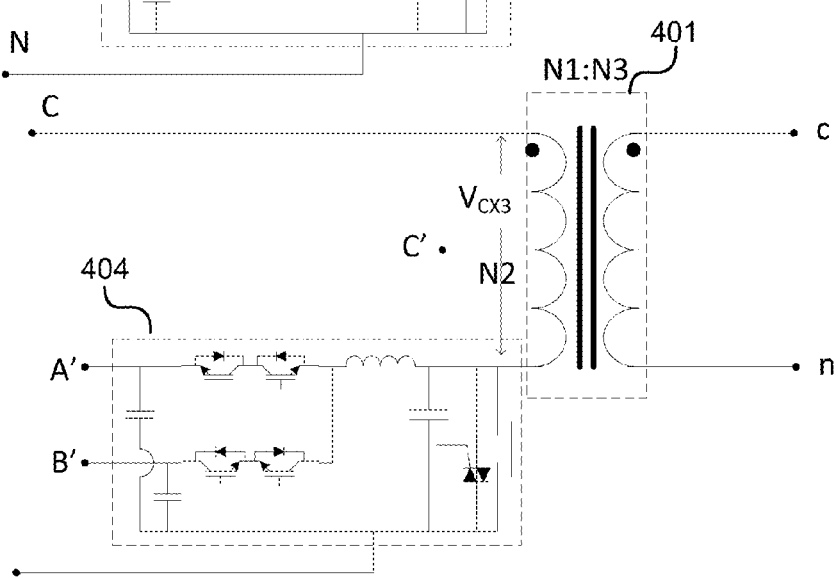
Figure 5A:
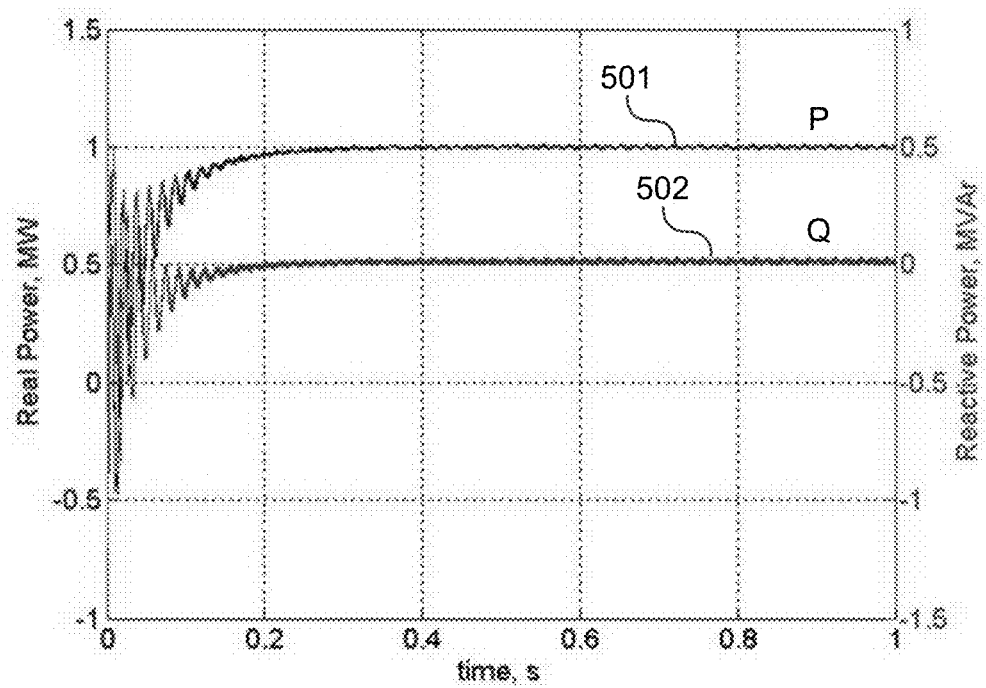
FIGS. 5A-5D illustrate operation waveforms of an example single-phase dynamic power flow controller in accordance with an embodiment of the present application.
Figure 5B:
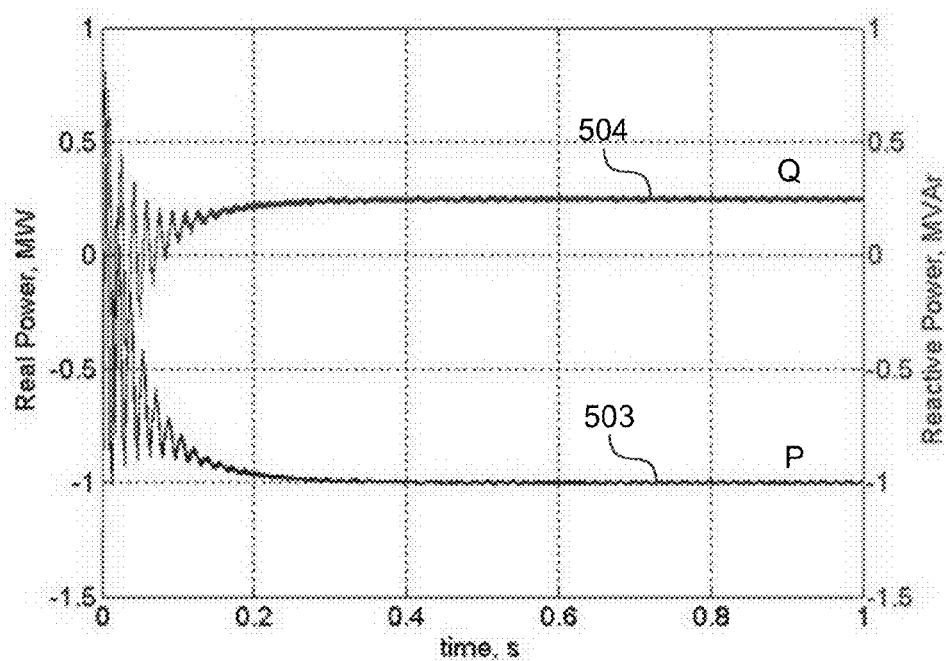
Figure 5C:
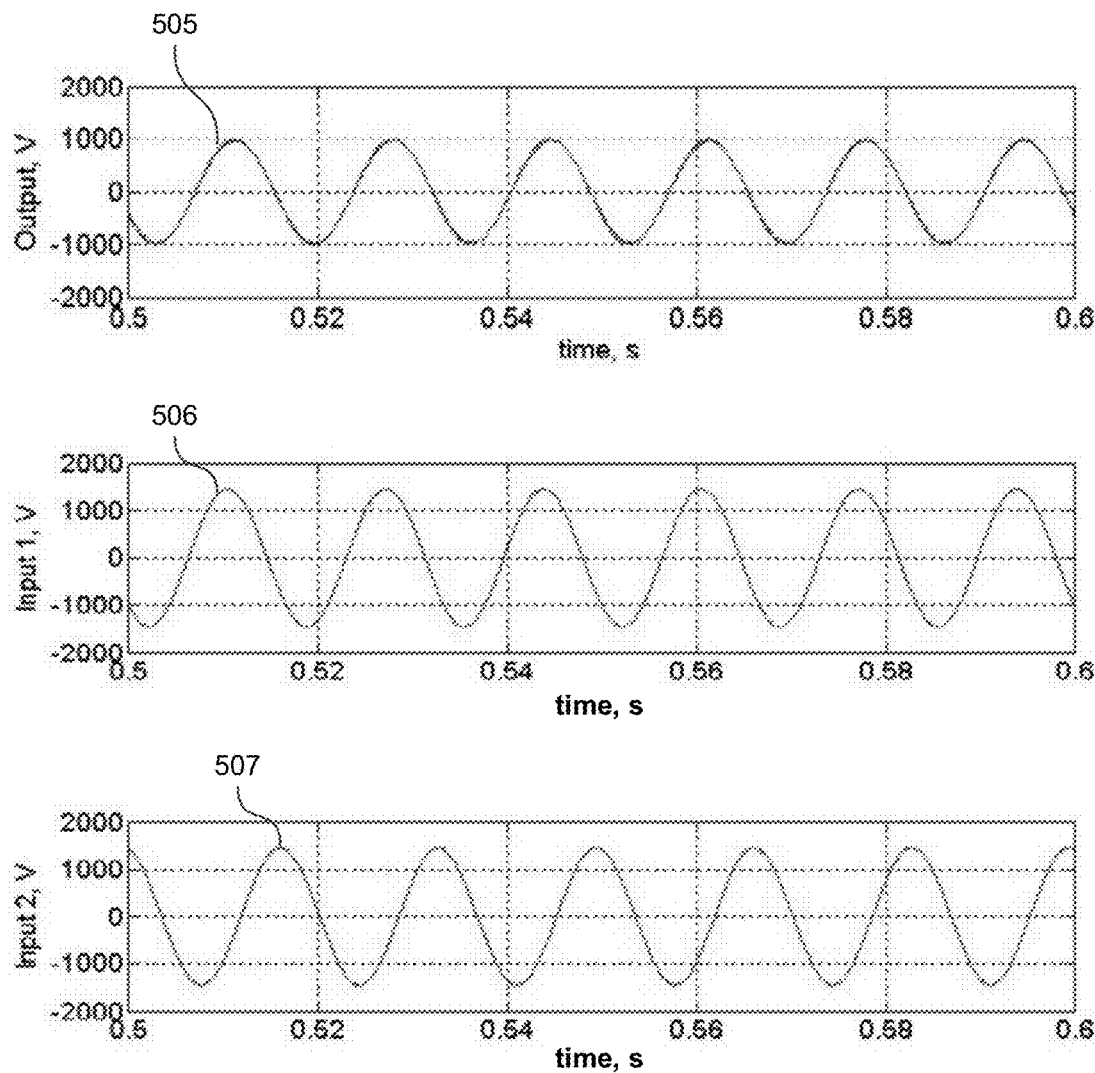
Figure 5D:
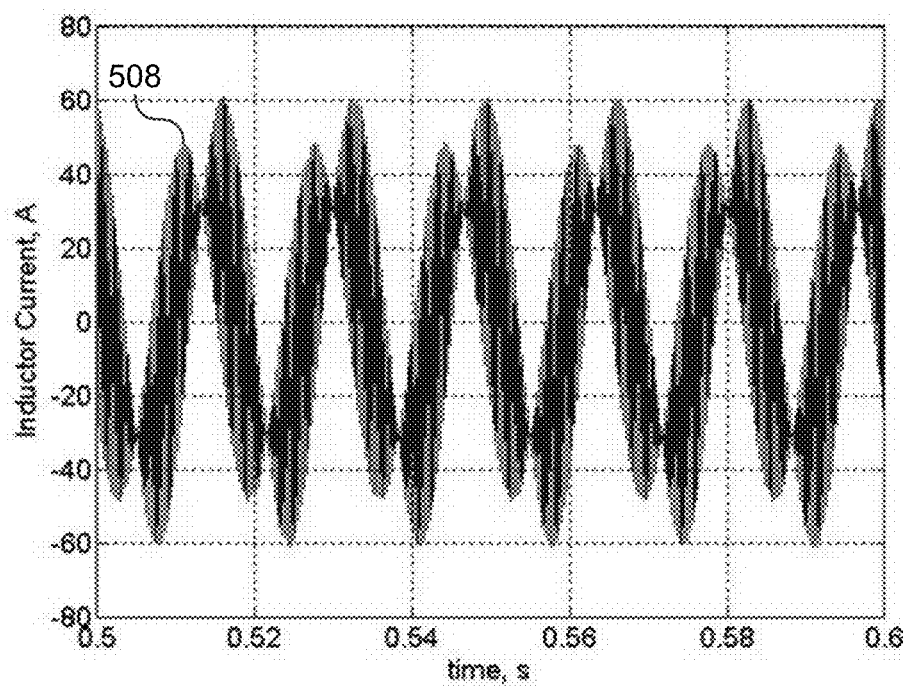

FIGS. 4A-4C illustrate an example schematic diagram of a three-phase dynamic power flow controller 400 in accordance with an embodiment of the present application. FIG. 4A illustrates the phase A implementation of the dynamic power flow controller 400, FIG. 4B illustrates the phase B implementation of the dynamic power flow controller 400, and FIG. 4C illustrates the phase C implementation of the dynamic power flow controller 400. The illustrated three-phase dynamic power flow controller 400 comprises a three-phase transformer 401 and AC power converters 402-404. The transformer 401 may be a standard Y-Y transformer with a tapped winding. The tapped winding may be on different sides of the transformer. When the tapped winding is positioned on the same side as the converter, as illustrated, the implementation (e.g., meeting BIL requirements, maintenance of galvanic isolation) may be simpler. Further, in such a configuration, the other winding without any tap (e.g., the $N_3$ winding of the transformer 401) may be WYE or DELTA configured. DELTA windings may be required when voltage step change takes place at key junctures of the sub-transmission and distribution grid.

The dynamic power flow controller 400 may further comprise a control module (not shown). The AC power converters 402-404 are coupled to the transformer 401 such that each of the power converters 402-404 is coupled between one terminal of the transformer 401 and the neutral line. For example, as illustrated in FIGS. 4A-4B, the power converter 402 is coupled between a terminal 410 of the transformer 401 and the neutral line 411. The terminal 410 is coupled to a terminal 412 of the transformer 401. The terminal 412 is a tapped winding on the $N_1$ windings side of the transformer 401 for phase B. The AC converters 402-404 may be housed adjacent to the transformer 401 without requiring a high-voltage isolating platform.

The dynamic power flow controller 400 is coupled between line-neutral voltages $V_A$, $V_B$, and $V_C$, and line-neutral voltages $V_a$, $V_b$, and $V_c$. The dynamic power flow controller 400 may regulate the line-neutral voltages $V_a$, $V_b$, and $V_c$, with respect to the line-neutral voltages $V_A$, $V_B$, and $V_C$, respectively. On the $N_1$ windings side of the transformer 401, for phases A, B, and C, the power converters 402-404 inject voltages $V_{X1}$, $V_{X2}$, and $V_{X3}$, in series with the voltages across the $N_1$ windings of the transformer 401, $V_{AX1}$, $V_{BX2}$, and $V_{CX3}$, respectively. Each injected voltage (e.g., $V_{X1}$, $V_{X2}$, and $V_{X3}$) may comprise a component that is in phase with the corresponding line-neutral voltage (e.g., $V_A$, $V_B$, and $V_C$, respectively) and a component that is quadrature with the line-neutral voltage (e.g., $V_A$, $V_B$, and $V_C$, respectively). As such, the amplitude and the phase angle of the line-neutral voltages $V_A$, $V_B$, and $V_C$ may be regulated with respect to the line-neutral voltages $V_a$, $V_b$, and $V_c$, respectively.

The control module (not shown) may regulate the duty cycle D for each power converters 402-404, respectively, thereby affecting the amplitude and the phase angle of the injected voltage for phases A-C, respectively. As such, the dynamic power flow controller 400 may regulate the amplitude and phase angle of the line-neutral voltages $V_a$, $V_b$, and $V_c$ with respect to the line-neutral voltages $V_A$, $V_B$, and $V_C$, respectively. One of ordinary skill in the art would appreciate that a three-phase dynamic power flow controller may be achieved by applying a single phase dynamic power flow controller to three phases with appropriate transformers.

FIGS. 5A-5D illustrate operation waveforms of an example single-phase dynamic power flow controller in accordance with an embodiment of the present application. Waveforms 511 and 513 illustrate active power flow P and waveforms 512 and 514 illustrate reactive power flow Q. Power flow may be controlled to flow in both directions. Waveforms 515-517 illustrate the output voltage, the input voltage, and the voltage at the tap winding of a power converter (e.g., for phase A) included in the dynamic power flow controller. Waveform 518 illustrates the inductor current of a power converter (e.g., for phase A) included in the dynamic power flow controller. Compared with the power flow regulated (e.g., up to 1 MW), the converter is fractionally rated (e.g., 30 KVA).

Figure 6A:
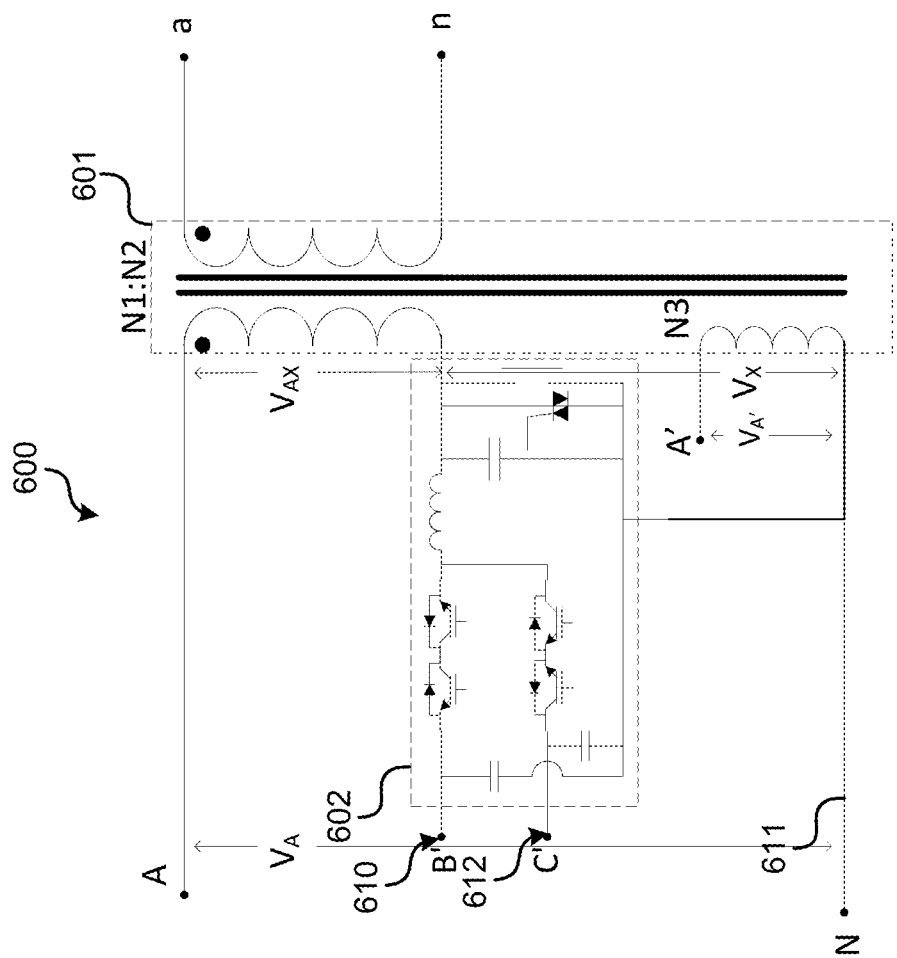
FIGS. 6A-6C illustrate an example three-phase dynamic power flow controller 600 in accordance with an embodiment of the present application.
Figure 6B:
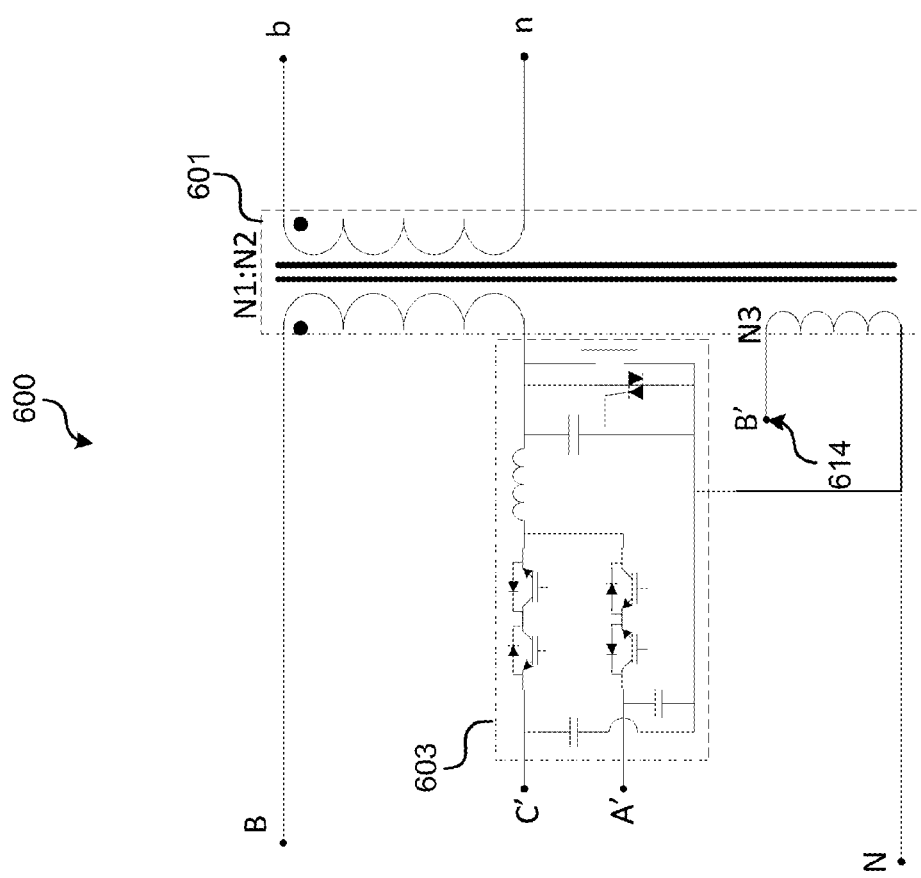
Figure 6C:
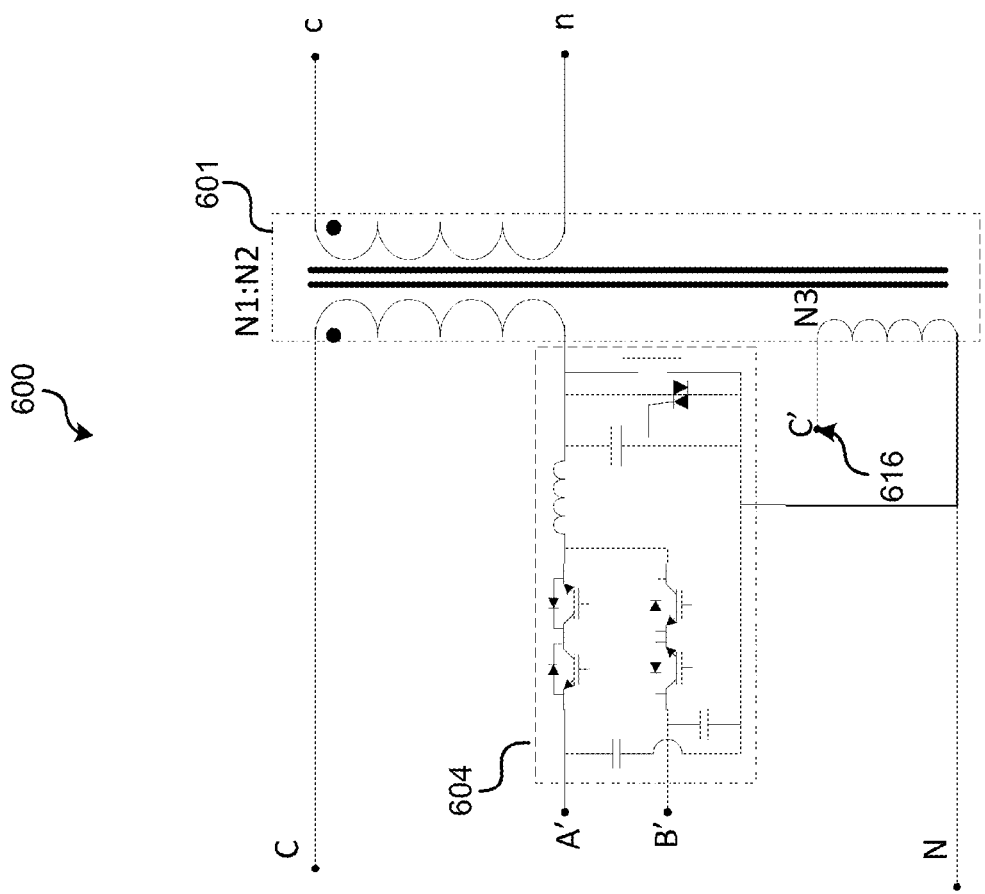

FIGS. 6A-6C illustrate an example three-phase dynamic power flow controller 600 in accordance with an embodiment of the present application. The three-phase power flow controller 600 comprises a transformer 601 and power converters 602-604. The power converters 602-604 may be fractionally-rated compared to the transformer 601. For each phase, the input of a power converter may be coupled to a set of voltage sources corresponding to the other two phases, and the output of a power converter may be coupled to the transformer winding. For example, for phase A illustrated in FIG. 6A, the input of the power converter 602 may be coupled to terminals 610 and 612, which are coupled to the taps 614 (illustrated in FIG. 6B) and 616 (illustrated in FIG. 6C), respectively. The taps 614 and 616 provide voltages $V_{B'N}$ and $V_{C'N}$, respectively. The output of the power converter 602 may be coupled to the $N_1$ winding of the transformer 601 for phase A.

For each phase, the power converter is configured to inject a voltage that is in series with the voltage across the transformer winding to which the power converter is coupled. The injected voltage comprises a first component that is in phase with the line-neutral voltage and a second component that is in quadrature with the line-neutral voltage. As such, both the amplitude and the phase angle of the voltages across the dynamic power flow controller 600 may be regulated. For example, the converter 602 may inject a voltage Vx in series with the voltage $V_{AX}$, that is across the primary winding of the transformer 601 for phase A. The injected voltage Vx, that is, the output voltage of the power converter 602, is based on the input voltages of the power converter 602: $V_{B'}$ and $V_{C'}$. The voltages $V_{B'}$ and $V_{C'}$ are the voltages across the $N_3$ windings of the transformer 601 for phases B and C, respectively. The injected voltage Vx is based on voltages $V_{B'}$ and $V_{C'}$. The injected voltage $V_X$ may be regulated to comprise a component that is in phase with the line-neutral voltage $V_A$ and in quadrature with the line-neutral voltage $V_A$. Accordingly, for phase A, the amplitude and the phase angle of the line-neutral voltage, $V_a$, across the $N_2$ windings may be regulated with reference to the line-neutral voltage, $V_A$.

The power flow controller 600 may comprise a control module (not shown). The control module may be configured to regulate the duty cycle for one or more power converters 602-604. In one embodiment, the switch duty cycle, D, for each power converter, may be modulated with a constant plus a second harmonic. The control module may be implemented by an example computing module as illustrated in FIG. 8. The control module may be configured to communicate with a grid control center.

Figure 7:
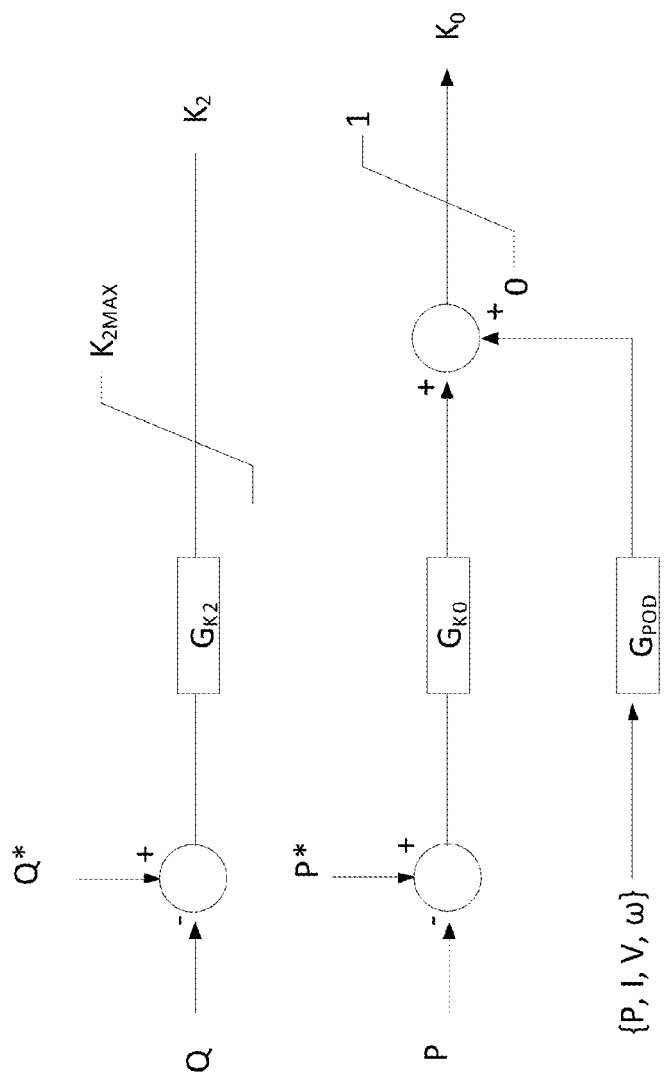
FIG. 7 illustrates a control block diagram of various embodiments of the present invention.

FIG. 7 illustrates a control block diagram of various embodiments of the present invention. In various embodiments, the duty value controlling each of the phase converters may be described as:

$$d_{abc}(t) = \begin{bmatrix} K_0 + K_2\sin(2\omega t + \phi_2) \\ K_0 + K_2\sin\left(2\omega t + \frac{2\pi}{3} + \phi_2\right) \\ K_0 + K_2\sin\left(2\omega t - \frac{2\pi}{3} + \phi_2\right) \end{bmatrix}.$$

The primary control variables are $K_0$, $K_2$, and $\phi_2$. $K_0$ is used to affect real power while $K_2$ is used to control reactive power. For embodiments with buck configurations, $K_0$ may be varied between the range of [0,1]. For embodiments with boost configurations, $K_0$ may be varied between the range of [0,0.5]. $\phi_2$ may be used to provide a third degree of control. Accordingly, the two loops are saturated such that this range is never exceeded.

The compensators, $G_{K0}$ and $G_{K2}$, are used to regulate real and reactive power, respectively. The compensator $G_{POD}$ is used to provide power oscillation dampening, of which the feedback variable may be power, voltage, current, and/or line frequency.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the invention using other computing modules or architectures.

Referring now to FIG. 8, computing module 800 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 800 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 800 might include, for example, one or more processors, controllers, control modules, or other processing devices, such as a processor 804. Processor 804 might be implemented using a general-purpose or special-purpose processing engine such as, for example, a microprocessor, controller, or other control logic. In the illustrated example, processor 804 is connected to a bus 802, although any communication medium can be used to facilitate interaction with other components of computing module 800 or to communicate externally.

Computing module 800 might also include one or more memory modules, simply referred to herein as main memory 808. For example, preferably random access memory (RAM) or other dynamic memory, might be used for storing information and instructions to be executed by processor 804. Main memory 808 might also be used for storing temporary variables or other intermediate information during execution of instructions to be executed by processor 804. Computing module 800 might likewise include a read only memory ("ROM") or other static storage device coupled to bus 802 for storing static information and instructions for processor 804.

The computing module 800 might also include one or more various forms of information storage mechanism 810, which might include, for example, a media drive 812 and a storage unit interface 820. The media drive 812 might include a drive or other mechanism to support fixed or removable storage media 814. For example, a hard disk drive, a floppy disk drive, a magnetic tape drive, an optical disk drive, a CD or DVD drive (R or RW), or other removable or fixed media drive might be provided. Accordingly, storage media 814 might include, for example, a hard disk, a floppy disk, magnetic tape, cartridge, optical disk, a CD or DVD, or other fixed or removable medium that is read by, written to or accessed by media drive 812. As these examples illustrate, the storage media 814 can include a computer usable storage medium having stored therein computer software or data.

In alternative embodiments, information storage mechanism 810 might include other similar instrumentalities for allowing computer programs or other instructions or data to be loaded into computing module 800. Such instrumentalities might include, for example, a fixed or removable storage unit 822 and an interface 820. Examples of such storage units 822 and interfaces 820 can include a program cartridge and cartridge interface, a removable memory (for example, a flash memory or other removable memory module) and memory slot, a PCMCIA slot and card, and other fixed or removable storage units 822 and interfaces 820 that allow software and data to be transferred from the storage unit 822 to computing module 800.

Computing module 800 might also include a communications interface 824. Communications interface 824 might be used to allow software and data to be transferred between computing module 800 and external devices. Examples of communications interface 824 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 824 might typically be carried on signals, which can be electronic, electromagnetic (which includes optical) or other signals capable of being exchanged by a given communications interface 824. These signals might be provided to communications interface 824 via a channel 828. This channel 828 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 808, storage unit 820, media 814, and channel 828. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 800 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system of controlling active and reactive power flows between a first AC source and a second AC source, comprising:
   a transformer comprising a first set of windings and a second set of windings, the first set of windings of the transformer configured to be coupled to a first line-neutral voltage of a first phase, the first line-neutral voltage corresponding to a first AC source; and
   a power converter having an input and an output, the input of the power converter configured to be coupled to a second voltage corresponding to a second phase and a third voltage corresponding to a third phase, the output of the power converter coupled to the second set of windings of the transformer;
   wherein the power converter is configured to inject an adjustable voltage in series with a voltage across the second set of windings of the transformer to create a second line-neutral voltage, the second line-neutral voltage corresponding to a second AC source.

2. The system of claim 1, wherein the transformer comprises a first tap configured to provide the second voltage and a second tap configured to provide the third voltage, the first tap and the second tap are configured to be on the first set of windings.

3. The system of claim 1, wherein the transformer comprises a first tap configured to provide the second voltage and a second tap configured to provide the third voltage, the first tap and the second tap are configured to be on the second set of windings.

4. The system of claim 1, wherein the second voltage is provided by a voltage source.

5. The system of claim 4, further comprising the voltage source.

6. The system of claim 4, wherein the voltage source is a medium voltage to 480V transformer.

7. The system of claim 1, wherein the transformer is a three-phase transformer and the first set of windings are connected in a delta configuration.

8. The system of claim 1, wherein the transformer is a single-phase transformer.

9. The system of claim 1, further comprising a control module, the control module configured to regulate a duty cycle of the power converter.

10. The system of claim 9, wherein the control module is configured to regulate the duty cycle based on a constant such that the adjustable voltage comprises a first voltage component in quadrature with the first line-neutral voltage.

11. The system of claim 9, wherein the control module is configured to regulate the duty cycle based on an even harmonic such that the adjustable voltage comprises a first voltage component in phase with the first line-neutral voltage.

12. The system of claim 11, wherein the even harmonic is a second harmonic.

13. The system of claim 1, further comprising a fail-normal switch, the fail-normal switch coupled across the power converter.

* * * * *